Dec. 15, 1964 J. M. FARMER 3,161,777
PHOTOELECTRIC SCANNING DEVICE
Filed Aug. 1, 1960

Inventor
John M. Farmer
by Roberts, Cushman & Grover,
Att'ys.

United States Patent Office 3,161,777
Patented Dec. 15, 1964

3,161,777
PHOTOELECTRIC SCANNING DEVICE
John M. Farmer, Wayland, Mass., assignor to Farmer Electric Products Co., Inc., Newton Lower Falls, Mass., a corporation of Massachusetts
Filed Aug. 1, 1960, Ser. No. 46,763
8 Claims. (Cl. 250—239)

The field of this invention is that of photoelectric devices, more particularly of apparatus for delivering photoelectrically induced signals derived from selected properties or functions of objects being scanned.

Photoelectric scanning devices of many types are available for regulating various industrial processes or for performing selective functions. Such devices usually incorporate means for directing a beam of light so that the light is refracted or absorbed by, or reflected from objects being scanned, and means for evaluating the light energy after having been affected by a scanned object. Since such devices are usually arranged for continuous operation so that their energy consumption is relatively high, various attempts to increase their efficiency have been made but these have generally been unsuccessful or have required the use of apparatus which was expensive to manufacture, install and operate because of cumbersome construction and inefficient energy utilization.

Objects of this invention are to provide a self-contained photoelectric scanning device of relatively high efficiency and diversified utility; to provide such a device which is of extremely simple and inexpensive operation; to provide such a device which is adapted to perform with a relatively high degree of reliability, uniformity and accuracy; and to provide such a device having a rugged construction which is inexpensive to manufacture and to install.

The substance of the invention in its principal aspects can be briefly summarized as follows.

Scanning devices according to the invention include an opaque body having a pair of bores which open at one end in side-by-side relation, the bores preferably having minimum spacing therebetween consistent with inexpensive manufacture of such a body. A lamp or other source of radiant energy is disposed within one of the bores for directing radiant energy through an open end of a bore towards an object to be scanned for reflection thereon and effectively back upon itself, into the open end of the other bore. Means sensitive to radiant energy are disposed in that other bore so that the reflected energy can impinge thereon and so that the energy-sensitive means are shielded from undesirable scatter and direct light.

In a practical embodiment of this invention the above-mentioned bores are parallel in a metal block, one containing a lamp and the other a photocell. The block is fitted to a standard pronged socket which provides the connections for lamp and photocell.

The lamp as well as the photocell are mounted on the bored block and on the socket by means of intermediate resilient means which serve mechanical as well as electrical purposes, reducing the necessary parts to a minimum and permitting assembly by means of simple screws which join a socket confining ring with the bored block and appropriately tighten the resilient means therebetween to establish mechanical fixation as well as electrical contacts.

In this preferred embodiment of the invention, the block or body has a recess intercepting a corresponding end of each bore oppositely of the support means, and means transparent to radiant energy, for example infrared transmitting filter means, are secured within the recess for closing the bore ends. If desired, the bore in which the lamp is disposed can be counterbored adjacent the transparent means and condensing lens means can be fitted within the counterbore to be held therein by the transparent means.

These and other objects and aspects of the invention will appear from the following description of a preferred practical embodiment thereof illustrating its novel characteristics.

The description refers to a drawing in which.

Figure 1:
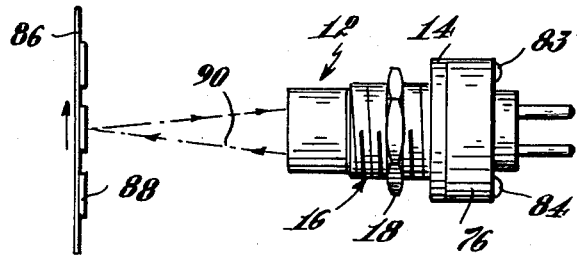
FIG. 1 is a side elevation of a photoelectric scanning device according to this invention.
Figure 2:
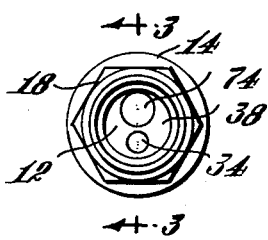
FIG. 2 is an end elevation of the device of FIG. 1 showing its scanning end.

The drawing shows a body 12 of brass, anodized aluminum, or other suitable opaque and electrically conductive material. The body is preferably of substantially cylindrical configuration having a flange portion 14 at one end and threaded portion 16 for engagement with nuts such as indicated at 18, for mounting the device upon a suitable support such as a panel. It will be understood that a panel or other supporting structure can be placed between a nut such as 18 and the flange 14, or between two nuts at any point on the thread 16, and that the device can be otherwise mounted in any convenient fashion suitable to the purpose at hand.

The flange portion 14 has threaded bores 22.

A pair of round parallel channels 24 and 26 extend axially through the body, these channels having minimum spacing therebetween consistent with inexpensive and yet structurally sound manufacture of the body by customary machining methods. The body has a recess 28 at its scanning end into which lead both bores 24 and 26. The bore 24 has counterbores, 30 and 31 respectively, at each end thereof, which define a narrower bore portion 32 therebetween.

Figure 3:
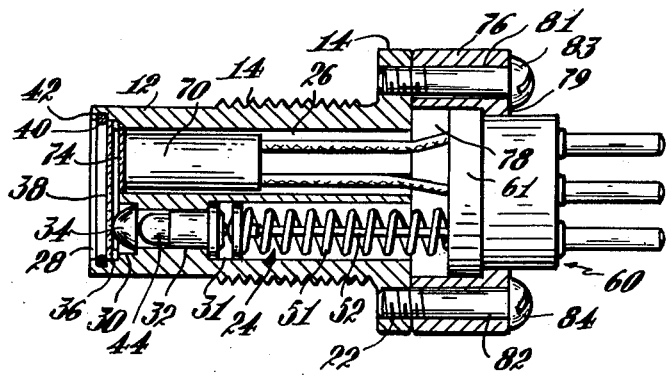
FIG. 3 is a section along line 3—3 of FIG. 2.

A condensing lens means such as the plano-convex lens 34 shown in FIG. 3 is preferably but not necessarily disposed within the counterbore 30 and a rubber washer 36 or the like is preferably fitted within the body recess 28. It will be understood that a condenser lens will in conventional manner provide practically uniform non-focused illumination of a plane at a given distance therefrom. A transparent cover such as the glass disc 38 is fitted within the recess 28 on top of the washer for closing the ends of both bores 24 and 26, and a retaining ring 40 of conventional type is fitted within a body groove 42 in the recess 28 for securing the transparent plate 38 within the body recess. In this embodiment, the plate holds the lens 34 within the counterbore 30.

Figure 4:
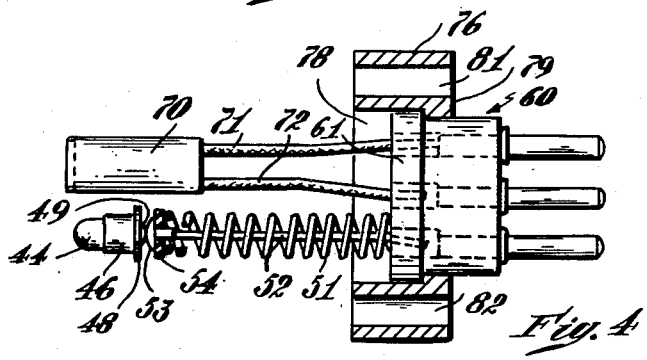
FIG. 4 is a partial section similar to FIG. 3 with the housing omitted.
Figure 5:
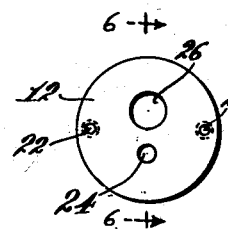
FIG. 5 is an end elevation of the housing showing its socket end.

A lamp 44 having a base 46 and a flange portion 48 (FIG. 4) is fitted within the bore 24 with its base portion within the counterbore 32. The lamp can be of any conventional type, in the present embodiment of a size requiring a low voltage A.C. power supply, and adapted to emit a substantial amount of infrared radiation is selected. This lamp has conventional terminals, one constituted by the flange 48, and a base terminal 49. The flange terminal makes electrical contact with the body 12 and the base terminal faces into the counterbore 31.

The large bore 26 contains a photoelectric means 70 which has a pair of stiff leads 71, 72 provided with a conventional insulating coating. The photoelectric cell 70 can be of any conventional type including the photo-conductive, photo-emissive and photo-voltaic types; in the present embodiment it is a solid state photocell of the photo-conductive type. An infrared transmitting filter 74 is preferably secured to the photocell with a suitable adhesive.

A ring member 76 has a recess or cavity 78 adapted to fit over the flange portion 61 of a conventional four pronged socket 60, the annulus 79 engaging the flange portion 61. The ring 76 has bores 81, 82 for screws 83 fitting the tapped holes 22 of the body flange 14.

Within the smaller bore 24 is a spring 51 surrounding a flexible, insulated electric lead wire 52 which is conductingly connected to a headed stud 53 (FIG. 4) which rests against the adjacent end of the spring 51 but is insulated therefrom by a washer 54. The lead wire 52 is in conventional manner connected within the socket 60, to one of the four prongs, and the two stiff conductors 71, 72 are similarly connected to the second and third prongs. The spring 51 is somewhat tensioned upon joining the wire 52 to the socket 60, so that it tends to move the stud 53 away from the socket. The spring is loose between the insulating washer 54 and the insulating socket body 60 so that, since wire 52 is insulated, the spring is fully insulated also.

Figure 6:
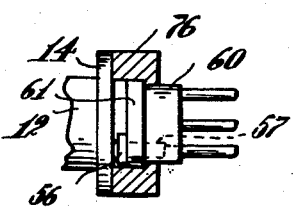
FIG. 6 is a section on line 6—6 of FIG. 5.

A spacer such as compression spring 56 is fastened to the socket 60 by means of a metal core stud such as rivet 57 (FIG. 6) which is conductingly connected to the fourth prong, as indicated in FIG. 6.

Upon assembly by means of the screws 83, 84, the photocell 70 is held within the bore 26 by its leads 71, 72, and the lamp 44 is pressed against the shoulder of counterbore 31 by the spring 51. The base contact 49 of the lamp makes thus contact with the head of stud 53 and through wire 52 with the respective socket prong. The flange contact 48 of the lamp makes electrical contact with the housing at the shoulder of 31, as shown in FIG. 3, and connects through the housing and the rivet 57 with the fourth prong which will normally be grounded. The rivet 57 thus serves a double purpose, namely that of an electrical conductor and also of the means for fastening the spring 56 which distances the socket 60 from the scanner body proper.

It will now be evident that the construction exemplified by the above described embodiment is optimally compact and rugged, and also very convenient due to possibility of using a single plug-in socket for both light source and detecting element constituting a self-contained unit.

In operation, the photoelectric scanning device according to this invention can for example be mounted as shown in FIG. 1, closely adjacent to a belt 86 upon which a series of objects 88 is disposed. The belt may for example be of relatively light-absorptive material and the objects of reflective material, the device being intended to count the objects on the belt as it moves past the device. The lens means 34 is adapted to condense radiant energy, emitted from the lamp 44 for forming a beam of light 90 and for directing the beam towards the belt 86. According to this invention, the light beam will be reflected at an angle of nearly 180° as shown in FIG. 1 each time a disc 88 passes before the scanning device, the reflected light being directed back through the filter 74 to impinge upon the photocell 70, thereby to effect an electrical signal for counting the discs in conventional manner.

Since the light beam is reflected at substantially a 180° angle, the device can be mounted very close to the observed object, for occluding a substantial proportion of ambient light, so that the light source 44 can be relatively weak and still provide a photoelectric signal which accurately corresponds to the differing reflective properties of the scanned objects. Since the reflection angle is very small, the incident and reflected rays being effectively parallel, substantially all incident light is utilized, if the scanning distance is comparatively short, and even scattering is rendered comparatively harmless. For these reasons, satisfactory operation does not depend on critical focusing and adjustment of the reflection angle. Further, mounting of the lamp 44 and the photoelectric means 70 within bores in closest possible side-by-side relation assures that the photoelectric means is shielded from direct light from the lamp. In addition, the use of the filter means 74 cuts off all but infrared radiation from incidence upon the photoelectric means further reducing, if desired, the disadvantageous effects which might result from ambient light impinging upon the photoelectric means. These optical advantages go hand in hand with the mechanical and commercial benefits of unusual ruggedness, compactness, and ease of installation. The simplicity and smallness of the device make it inexpensive as to manufacture as well as operation.

I claim:

1. A photoelectric scanning device comprising:
   opaque body means having a pair of straight bores with ends axially open at both sides of the body means, and said body means having a common recess extending over both said bores at one side of the body means;
   radiant energy source means disposed within one of said bores for directing radiant energy freely through said open end on one side of said bore upon an external object for unobstructed reflection of said energy directly through the adjacent open end of the other of said bores;
   means sensitive to radiant energy disposed within said other bore and fully exposed on said one side of the body means to said reflection so that the reflection energy can axially impinge thereon;
   and at said recessed side of said body means and axially extending into said recess, socket means for supplying through the recess current to and for supporting said source means and said sensitive means respectively, and having flange means for securing it to said body means.

2. A photoelectric scanning device comprising:
   an opaque body block having a pair of bores which open at one end of each bore optically unobstructed and in side-by-side relation, with sidewalls solid with a partition of minimal spacing therebetween;
   light source means disposed in one of said bores for directing an unobstructedly wide and diffuse beam of light directly through said open end of said bore upon an external object essentially in the direction of its axis, for reflection at an angle of effectively 180° from said object directly through said open end of the other of said bores;
   and light-sensitive means disposed in said other bore for direct and unobstructed impingement thereon of said reflected light essentially in said direction of said bore axis;
   whereby variations of the radiant energy from the source means caused by an object in front of the device can be detected by the sensitive means within a wide area and within a wide range of distance of the object from the device.

3. A photoelectric scanning device comprising:
   an opaque cylindrical body having a pair of bores extending therethrough essentially parallel and in close proximity, and having a flange on one end;
   lamp means in one of said bores;
   photoelectric means in the other bore;
   said lamp means and photoelectric means effectively pointing at the other end of the body through said bores such that reflected light from the lamp means can be received by the photoelectric means;
   round socket means for mechanically supporting and electrically connecting both said lamp means and said photoelectric means;
   and a recessed ring member engaging said socket means and secured to said flange of the body for detachably holding said body and said supporting and connecting socket means in assembled relation.

4. Device according to claim 3 wherein said photoelectric means are electrically connected to said supporting and connecting means by relatively rigid conductors, which serve to support said photoelectric means resting loosely within said second bore.

5. A photoelectric scanning device comprising:
an opaque body having a pair of circular bores extending in close proximity therethrough, said body having at one end a circular recess intercepting corresponding adjacent ends of said bores;
circular transparent plate means fitted within said recess for closing in common both said bore ends;
radiant energy source means;
photoelectric means;
circular common supporting means fitted at the other end of said body over the other ends of said circular bores for securing said source means within one of said bores by pressing it towards said plate means for directing radiant energy through said plate means towards an object located outside of the body for reflection back through the plate means into the other of said bores, and for holding said photoelectric means within said other bore against said plate means so that said reflected energy can impinge thereon;
means on said common supporting means for connecting said source means and said photoelectric means to an electrical circuit;
and circular means engaged with said common supporting means and detachably secured to said body, for detachably holding said body and support means in assembled relation.

6. A photoelectric scanning device comprising:
an opaque body having a first and second bore extending therethrough in close proximity side-by-side, said first bore having a counterbore at one end;
a lamp disposed within said first bore for directing light through the other end of said first bore towards an external object for reflection back through a corresponding end of said second bore, said lamp having flange means fitted within said counterbore;
unitary support means having a base portion extending over said counterbore and the corresponding end of said second bore, said support means having spring means extending therefrom into said counterbore against said lamp flange means for holding said lamp within said first bore;
photoelectric means mounted on said support means and extending into said second bore so that the reflected light can impinge thereon;
said support means having socket means extending oppositely of said spring means and means for connecting said lamp and said photoelectric means in electrical circuits;
and a ring member engaged with said support means base portion and detachably secured to said body for detachably holding said body and support means in assembled relation.

7. A photoelectric scanning device comprising:
a metal body having a first and a second bore extending parallel therethrough in close proximity, said first bore having a counterbore at one end;
a lamp disposed within said first bore for directing light through the other end of said first bore upon an external object for reflection through the adjacent end of said second bore, said lamp having a flange fitted within said counterbore, said lamp having a flange terminal adapted to contact said body and a base terminal facing into said counterbore insulated from said body;
an insulating support having a flange portion, a socket portion, and four prongs extending outwardly from said socket portion;
resilient distancing means;
a conductive inwardly extending stud for fastening said distancing means to said socket portion with one end connected to one of said four prongs and having at the other end a head in contact with said body and hence with said flange terminal;
flexible conductive means joined at one end to a second connecting means, having contact means at the other end and having spring means extending from said support into said counterbore to hold said contact means against said lamp base terminal for making electrical connection therewith and for holding said lamp within said core;
photoelectric means within said second bore;
means for mounting said photoelectric means on said socket portion and for electrically connecting it to a third and a fourth connecting means; and a ring member fitted over said flange portion of the insulating support and clamped to said body for detachably holding said body and said support in assembled relation.

8. A photoelectric scanning device comprising:
a metallic body having a pair of parallel bores extending therethrough with minimum spacing therebetween, said body having a recess intercepting adjacent ends of said bores, and one of said bores having a counterbore at each end;
condensing lens means disposed in the counterbore adjacent said recess;
a transparent plate secured within said recess for closing said bore ends and for holding said lens means within said counterbore;
a lamp disposed within said bore adapted to emit radiation through said plate to an external object for reflection back through said plate into the other of said bores, said lamp having a flange fitted within the other of said counterbores, said lamp having a flange terminal adapted to contact said body and said lamp having a base terminal facing into said other counterbore insulated from said body;
an insulating support having a flange portion and a socket portion with four externally extending contact means;
a spacer of resilient material fitted between said socket portion and said body, and said spacer having an electrically conductive core stud extending therethrough, connected to one of said contact means, and contacting the body;
a flexible conductor connected to a second contact means and having a spring extending therefrom into said other counterbore for holding said flexible conductor against said lamp base terminal within said bore;
photoelectric means extending from said socket portion into said other bore so that the reflected radiation can impinge thereon;
means for conductively connecting the third and fourth ones of said contact means and said photoelectric means;
and a ring member fitted over said support flange portion and secured to said body for detachably holding said support and body in assembled relation.

References Cited by the Examiner
UNITED STATES PATENTS

| | | | |
|---|---|---|---|
| 2,331,144 | 10/43 | Sitter | 250—202 X |
| 2,415,436 | 2/47 | Maris | 250—227 X |
| 2,420,716 | 5/47 | Morton et al. | 250—227 |
| 2,493,919 | 1/50 | Holmes | 250—239 X |
| 2,596,591 | 5/52 | Packard et al. | 250—224 |
| 2,611,097 | 9/52 | Stanley et al. | 250—224 |
| 2,838,683 | 6/58 | Munro | 250—202 X |
| 2,918,585 | 12/59 | Farmer | 250—239 |
| 2,920,209 | 1/60 | Asten | 250—239 |

RALPH G. NILSON, *Primary Examiner.*

RICHARD M. WOOD, *Examiner.*